US008578439B1

(12) United States Patent
Mathias et al.

(10) Patent No.: US 8,578,439 B1
(45) Date of Patent: Nov. 5, 2013

(54) METHOD AND APPARATUS FOR PRESENTATION OF INTELLIGENT, ADAPTIVE ALARMS, ICONS AND OTHER INFORMATION

(75) Inventors: Keith E. Mathias, Ossining, NY (US); Karen I. Trovato, Putnam Valley, NY (US); J. David Schaffer, Wappingers Falls, NY (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 09/493,961

(22) Filed: Jan. 28, 2000

(51) Int. Cl.
    *H04N 5/445* (2011.01)
    *H04N 7/16* (2011.01)
(52) U.S. Cl.
    USPC ............ 725/141; 725/46; 725/48; 725/58
(58) Field of Classification Search
    USPC ............ 725/46–48, 39, 141, 58; 348/734
    See application file for complete search history.

(56) References Cited

U.S. PATENT DOCUMENTS

| 5,410,367 | A | | 4/1995 | Zahavi et al. ............ 348/725 |
|---|---|---|---|---|
| 5,710,605 | A | | 1/1998 | Nelson ............ 348/734 |
| 5,734,444 | A | * | 3/1998 | Yoshinobu ............ 725/14 |
| 5,805,806 | A | * | 9/1998 | McArthur ............ 709/250 |
| 5,977,964 | A | * | 11/1999 | Williams et al. ............ 715/721 |
| 6,061,056 | A | * | 5/2000 | Menard et al. ............ 715/704 |
| 6,121,885 | A | * | 9/2000 | Masone et al. ............ 340/628 |
| 6,177,931 | B1 | * | 1/2001 | Alexander et al. ............ 725/52 |
| 6,188,985 | B1 | * | 2/2001 | Thrift et al. ............ 704/275 |
| 6,313,887 | B1 | * | 11/2001 | Gudorf ............ 348/734 |
| 6,374,296 | B1 | * | 4/2002 | Lim et al. ............ 709/225 |
| 6,408,437 | B1 | * | 6/2002 | Hendricks et al. ............ 725/132 |
| 6,466,232 | B1 | * | 10/2002 | Newell et al. ............ 715/700 |
| 6,509,908 | B1 | * | 1/2003 | Croy et al. ............ 345/716 |
| 6,898,762 | B2 | * | 5/2005 | Ellis et al. ............ 715/716 |
| 7,185,355 | B1 | * | 2/2007 | Ellis et al. ............ 725/46 |
| 7,856,650 | B1 | * | 12/2010 | Harvey et al. ............ 725/135 |
| 2002/0026496 | A1 | * | 2/2002 | Boyer et al. ............ 709/218 |
| 2003/0020744 | A1 | * | 1/2003 | Ellis et al. ............ 345/723 |
| 2003/0088872 | A1 | * | 5/2003 | Maissel et al. ............ 725/46 |
| 2003/0093813 | A1 | * | 5/2003 | Shintani et al. ............ 725/133 |
| 2003/0149988 | A1 | * | 8/2003 | Ellis et al. ............ 725/87 |
| 2005/0028208 | A1 | * | 2/2005 | Ellis et al. ............ 725/58 |
| 2005/0149964 | A1 | * | 7/2005 | Thomas et al. ............ 725/9 |

(Continued)

FOREIGN PATENT DOCUMENTS

| WO | WO9843158 | 10/1998 | ............ G06F 3/147 |
|---|---|---|---|
| WO | WO9914947 | 3/1999 | ............ H04N 5/445 |
| WO | WO9965237 | 6/1999 | |
| WO | WO0001149 | 1/2000 | |

*Primary Examiner* — An Son P Huynh (57) ABSTRACT

System actions such as presentation of information to a user via a remote control device are carried out in accordance with user preferences based on, e.g., observed user behavior over time. The preferences may be learned by observation of user actions and corresponding system state information, and the preferences may be verified by the user. Particular actions may then be repeated under the control of the system, when appropriate conditions are met. Repetition may be automatic, semi-automatic or user initiated. In an illustrative embodiment, information is presented to a user via a remote control device based at least in part on the determined preference. The information presented to the user via the remote control device may include, e.g., an alarm signal associated with a particular parameter specified by the user, a visible icon presented to the user on a display of the remote control device, or other types of information presented via other types of interfaces, such as audio, speech or tactile interfaces.

21 Claims, 3 Drawing Sheets

(56) References Cited

U.S. PATENT DOCUMENTS

| | | | |
|---|---|---|---|
| 2005/0198063 A1* | 9/2005 | Thomas et al. | 707/102 |
| 2005/0204388 A1* | 9/2005 | Knudson et al. | 725/58 |
| 2005/0262542 A1* | 11/2005 | DeWeese et al. | 725/106 |
| 2006/0190966 A1* | 8/2006 | McKissick et al. | 725/61 |
| 2010/0107194 A1* | 4/2010 | McKissick et al. | 725/40 |

* cited by examiner

METHOD AND APPARATUS FOR PRESENTATION OF INTELLIGENT, ADAPTIVE ALARMS, ICONS AND OTHER INFORMATION

FIELD OF THE INVENTION

The present invention relates generally to remote control devices and other types of information presentation devices, and more particularly to user interface simplification in such devices based on observed patterns.

BACKGROUND OF THE INVENTION

Remote control devices are commonly used for controlling the operation of audio-visual components such as a television (TV), video cassette recorder (VCR) or stereo. High-end remote control devices may be equipped with liquid crystal display (LCD) screens, e.g., a screen having a diagonal measurement of typically about six inches or less, for presenting information to a user. The presented information may include, e.g., context-sensitive component control menus which change depending on the activity and component being controlled. These high-end remote devices also include appropriate logic and processing circuitry, and may include a mechanism for receiving information signals from other devices.

An example of a conventional display-equipped remote control device is described in U.S. Pat. No. 5,410,367, entitled "Television Program Scheduler for Providing an Indication to a User that a Television Program is About to Start." This remote control device includes a display which provides information alerting a user that a particular broadcast program is about to begin.

Another similar conventional device is described in U.S. Pat. No. 5,710,605, entitled "Remote Control for Controlling Television and Videocassette Recorder with a Display for Allowing a User to Select Between Various Programming Schedules." This device assists a user in selecting paid programming. The device includes a display with a scrollable menu such that the user can determine what programming is currently available. The user can then order the programming from a provider via a modem connection between the device and a telephone line.

Yet another display-equipped remote control device is described in PCT Application No. WO 98/43158 entitled "Two-Way Remote Control With Advertising Display." This device includes a display on which information, such as an advertisement, is presented to the user. The displayed information may be related to programming presented to the user via the TV.

Another conventional system is described in PCT Application No. WO/34599 entitled "System for Dual-Display Interaction with Integrated Television and Internet Content." This system uses two or more physically independent displays for enhanced viewing of multiple broadcast signals, Internet data or other local data such as information related to the state of a user's home appliances. The system includes a hand-held and portable remote control with a motion picture display.

The above-described conventional display-equipped remote control devices and their associated systems have a number of significant drawbacks. For example, these devices and systems are generally unable to provide more sophisticated functions such as controlling data collection and analysis operations specific to a particular user, i.e., the devices and systems are unable to "learn" the intentions of a user and whether or not the user would like these intentions to be carried out automatically in the future when faced with the same state information. In addition, none of the devices and systems is designed to provide automated user-specific intelligent alarms and icons driven adaptively by information from multiple diverse information sources.

A need therefore exists for improved information presentation techniques which overcome the limitations of the above-described conventional devices and systems.

SUMMARY OF THE INVENTION

The invention provides methods and apparatus for carrying out system actions, such as presentation of information to a user via a remote control device, in accordance with user preferences based on, e.g., observed user behavior over time. For example, an illustrative embodiment of the invention provides an improved remote control device which is capable of displaying or otherwise presenting intelligent, adaptive alarms and icons based on learned preferences of a particular user. The preferences may be learned by observation of user actions and corresponding system state information, and the preferences may be verified by the user. Particular actions may then be repeated under the control of the system, when the appropriate conditions are met. Repetition may be automatic, semi-automatic or user initiated.

In the illustrative embodiment of the invention, a remote control device operates in conjunction with, e.g., a computer, set-top box, television or other suitable processor-based device to automatically determine the preference of a user with regard to presentation of a particular type of information available from a particular information source. The information is then presented to the user via the remote control device based at least in part on the determined preference.

It should be noted that in other embodiments of the invention, preference determination, information presentation and other functions may be implemented at least in part in the remote control device.

The information may come from one or more of, e.g., a network connection, a telephone connection, a computer connection, a security system, a satellite system, a terrestrial broadcast system, a cable system, an information storage system or any other suitable source. The information can also be generated at least in part by the remote control device, e.g., via user interaction. Examples of information that may be presented to the user via the remote control device include an alarm signal associated with a particular parameter specified by the user, and/or a visible icon presented to the user on a display of the remote control device. Information may be presented in many other forms, e.g., in the form of audio information, speech, tactile sensations such as vibrations, etc.

By way of illustration, a processing system in accordance with the invention may be configured to detect when a movie likely to be of interest to a user will be broadcast, based on information supplied by a television recommender program, and to set off an alarm via the remote control device notifying the user before the movie is about to begin.

Advantageously, the invention allows a remote control device or other system device to provide information which is adaptively tailored to the particular habits and interests of a given user or set of users. By displaying information, such as alarms and icons, in accordance with learned user-specific behavior, a remote control device in accordance with the invention is less likely to present irrelevant or redundant information to users. In addition, it can serve as a presentation point for a wide variety of different types of information, from many different sources. These and other features and advan-

DETAILED DESCRIPTION OF THE INVENTION

Figure 1:
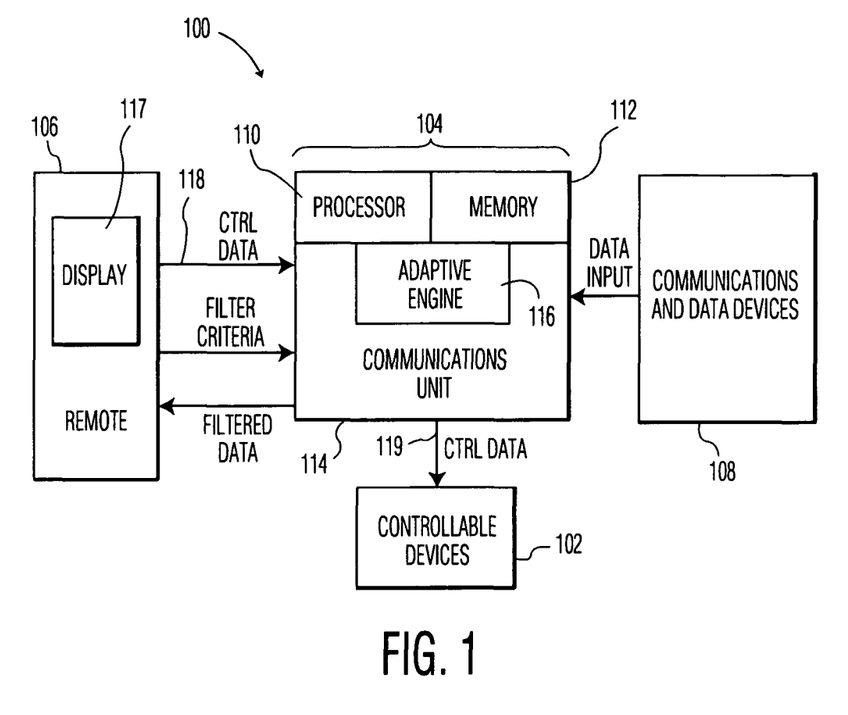
FIG. 1 is a block diagram illustrating an example of a processing system in which the invention may be implemented.

FIG. 1 shows an example of a processing system 100 in which the present invention may be implemented. The system 100 in this embodiment includes one or more controllable devices 102, a processor-based device 104, a remote control device 106, and a set of communication and data devices 108. The communication and data devices 108 may include devices that are data input only, controllable only, or both data input and controllable. It should be noted that the processor-based device 104 may be implemented at least in part within the remote control device 106, e.g., the devices 104 and 106 may be physically combined in whole or in part.

The processor-based device 104 includes a processor 110, a memory 112, a communications unit 114, and an adaptive engine 116. The processor-based device 104 may represent, e.g., a set-top box, a computer, a palm-top computing device, as well as portions or combinations of any of these and other processor-based devices.

The processor 110 may represent, e.g., a microprocessor, digital signal processor, central processing unit, computer, circuit card, application-specific integrated circuit (ASIC), field programmable gate array (FPGA), or microcontroller, as well as portions or combinations of these and other types of processing devices.

The memory 112 may represent an electronic memory, an optical or magnetic disk-based memory, a tape-based memory, as well as portions or combinations of these and other types of memories.

The remote control device 106 is equipped with a display 117, which may be, e.g., a conventional LCD display, of any desired size practical for use in conjunction with the device 106.

Input to the remote control device 106 may be acquired through responses to traditional graphical modalities (such as buttons, sliders, menus, fill-in boxes, etc.), but the input may also employ handwriting recognition, shorthand-style pen gestures, speech recognition, or visual gesture recognition of facial or body expressions.

In accordance with the invention, the remote control device 106 delivers control data and filter criteria to the processor-based device 104, and receives filtered data from the processor-based device 104 for presentation to a user via the display 117 of the remote control device 106. The filter criteria and filtered data are determined in accordance with an automated learning process that will be described in greater detail below in conjunction with the data flow and process flow diagrams of FIGS. 3 and 4, respectively.

Although the display 117 is shown as incorporated into the remote control device 106 in the illustrative embodiment of FIG. 1, this is by way of example only. In other embodiments, a projection display may be used in conjunction with or in place of the display 117. For example, the remote control device 106 may be equipped with a display projection apparatus, such that a display can be generated and projected by the device 106, e.g., onto a wall or ceiling. The term "display" as used herein is intended to include such projection displays as well as other known types of displays.

It should also be noted that the invention can present information to a user through many other mechanisms in addition to or instead of through the display 117 or the above-noted projection display. For example, intelligent alarms can be presented to a user via an audio or speech interface, a tactile interface, or other suitable information communication mechanism. An example of a tactile interface is a vibration-type mechanism which alerts the user to particular events through certain prespecified types of vibration. Other examples include a controllable surface that can be altered to form a variety of tactile sensations suitable for communicating information, or simply a vibration as a source of an alarm.

Alternatively, the information may be communicated to the user via another device such as a television, computer or synthesized speech device.

The communications unit 114 of the processor-based device 104 interfaces with the set of communications and data devices 108. The set of communications and data devices 108 includes a diverse array of information sources such as, e.g., a telephone, a caller identification device, a video cassette recorder, a personal computer (PC) connection, a World Wide Web (WWW) connection or other Internet connection, a local area network (LAN) connection, a security system, a satellite system, a terrestrial broadcast system, a cable system, a video hard disk (HD) such as local compact disk jukebox, audio or video tape library, digital video disk, etc. It should be noted that a single communication interface device could be used to decode information from these and other types of conventional media.

The communications unit 114 also interfaces with the controllable devices 102. The controllable devices 102 may include at least a subset of the above-noted communications and data devices 108, as well as other controllable devices. The controllable devices 102 may in some cases therefore be the same as the communication and data input devices 108, e.g., PC, telephones, WWW, satellite, cable, video HD, etc. However, some devices 108 provide only input data, e.g., caller ID, TV broadcast, etc., while some devices 102 are controllable but provide no input data, e.g., lights, X-10, TV channel/volume control, etc.

In accordance with the invention, information from one or more of the above-noted information sources, or from other suitable information sources, is processed in accordance with the above-noted control data and filter criteria, and presented to the user via the remote control display 117.

Advantageously, the invention filters the data presented to the user via the display 117 such that the presented information is tailored to learned user preferences. As will be apparent to those skilled in the art, the characteristics of the corresponding interfaces required in communications unit 114 for interfacing with the set of communications and data devices 108 will vary depending upon the particular types of information sources used. For example, the interfaces in communication unit 114 may include, e.g., a satellite, broadcast or cable interface, a disk input-output device, or a set of network connections, e.g., transmission control protocol/Internet protocol (TCP/IP) connections, used to access one or more remote servers over the Internet.

Input from the communications and data devices 108 or remote control device 106 may be converted to data using conventional graphical modalities or recognition systems. Graphical modalities (such as buttons, sliders, menus, fill-in boxes, etc.) can be converted to value settings or device commands, for example. Recognition systems for handwriting, pen gestures, speech, or visual gestures can also produce summarizing data. As an example, a handwritten "Turn TV On," may be recognized as "touched pixels" that are then translated to text, converted to control data 118, transmitted to the processor device 104, and then issued to a television in a living room via a single IR code. Similarly, visual gestures, such as signing for the hearing impaired, can be identified by a camera and recognition processor so that the same "Turn TV On" is generated.

It should be noted that elements or groups of elements of the system 100 may collectively represent a desktop, laptop or palmtop computer, a personal digital assistant (PDA), a remote control device, a television, or a set-top box, as well as portions or combinations of these and other devices.

It should also be understood that the invention may be implemented in other types of systems. For example, in other embodiments of the invention, portions of the processor-based device 104 may be implemented in a television or a remote control device. Moreover, as previously noted, one or more of the elements of the system, such as the processor 110, memory 112 and communications unit 114 may be implemented as an ASIC or circuit card to be incorporated into a television, computer, set-top box or other device.

In operation, the system 100 of FIG. 1 allows the remote control device 106 to receive event-related information from one or more of the communications and data devices 108 in accordance with stored information regarding learned user preferences. More particularly, the system 100 determines from the communications and data devices 108, the occurrence of events likely to be of interest to the user, and provides appropriate corresponding event indicators, such as alarms or icons, for presentation to the user via display 117 or other communications device. These alarms or icons can alert the user that an event of interest has occurred, and can specifically identify the area of interest associated with the event. The user, by entering appropriate filter criteria via the remote control device 106, can "customize" the device such that the device knows what types of events the user is interested in.

Advantageously, the processor-based device 104 can associate priorities with particular events based on user preference so that events of sufficient priority level can interrupt current user activities. For example, the remote control device 106 may be signaled via a WWW connection established via one of the communications and data devices 108.

In this case, information such as updates from an Internet-based service, e.g., www.pointcast.com, could be monitored and when determined to be of sufficient interest to the user, such as a local school closing, an appropriate alarm, e.g., a particular sound, vibration, etc. could be generated by the remote control device 106 in order to alert the user as to the occurrence of the event. An identifying icon and corresponding text could be displayed on the display 117 in conjunction with or in place of the alarm.

The user could then choose to disregard the event, or to take the appropriate action to obtain additional information relating to the event. An example of one such appropriate action is for the user to enter a command on the remote control device 106 to configure the system such that the corresponding WWW input is displayed on the remote control display 117 rather than on a television. The remote control display 117 in this case serves as an auxiliary display device which extends the available viewing area for icons, so that icons need not clutter the television display when a user is watching television.

As previously noted, the system 100 is configured to learn which events a particular user is interested in, and at what times and during what activities the user is interested in those events. For example, if an incoming telephone call from a telephone number associated with a family member occurs, a user might want to be alerted of this event regardless of their current activity. Therefore, presentation of a corresponding alarm and icon via the remote control device 106 may be appropriate. Another type of icon that is displayed in this context may be an icon which when activated by a corresponding command entry allows the user to begin recording the television program while taking the call, thereby allowing the user to watch any missed portions of the program after the call is concluded.

Such context-sensitive user behavior can be automatically learned by the system over a given period of time, such that the alarms and icons presented to a given user intelligently and adaptively reflect previous actions by that user. It is also possible for the system to implement an automated interactive query and programming session with the user at particular intervals, e.g., after the system observes several specified actions.

For example, from control data 118 entered on the remote control 106, the system may detect that the user muted the television, activated a VCR or other recording device, and then answered the telephone when an incoming call was received from a particular caller as identified from the caller identification device. The system could recognize a sequence of actions of this type and then query the user as to whether the user would like to automate such actions when similar conditions occur in the future. In this case, the system could also query the user for additional information, e.g., other telephone numbers for which these same actions should occur. These actions would be automatically generated and sent to the controllable devices 102 via control data 119. Alternatively, the user could affirmatively direct the system to automate a given set of actions, e.g., by depressing a "learn" key on the remote device 106 after taking the actions.

As another example, a processing system in accordance with the invention may be configured to detect when a movie likely to be of interest to a user will be broadcast, based on information supplied by a television recommender program, and to set off an alarm via the remote control device notifying the user before the movie is about to begin.

As yet another example, the system could alert the user of particular visitors when connected to a security system. Using techniques for detecting the presence of a person from a video camera data stream and recognizing and cataloging appropriate features of a person for future recognition, the system could alert the user that a particular person has been detected. The particular person may be, e.g., a person that the user has had some undesirable interaction with in the past. The user can instruct the system to catalog the appropriate features of such a person, such that the next time the person is detected by the security system the authorities can be notified automatically by telephone.

Figure 2:
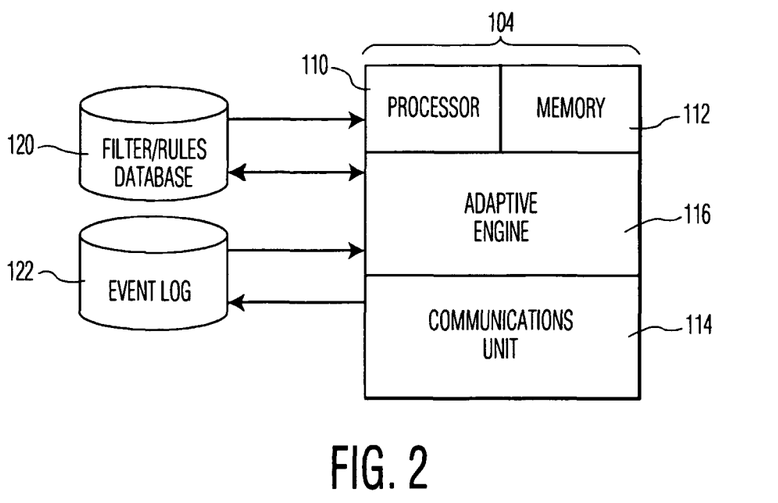
FIG. 2 illustrates the interaction between a processing device of the system of FIG. 1 and information storage elements including a filter/rules database and an event log.

FIG. 2 is a block diagram illustrating the interaction between the processor-based device 104 and a number of additional system elements used to implement the above-described functionality. In this embodiment, the additional system elements include a filter/rules database 120 and an event log 122. The event log 120 may be any memory device, e.g., RAM, disk, etc., that is capable of logging event-related information such as the time and system state of command and/or control actions or other events that take place in the system 100. The filter/rules database 122 may be any memory device capable of storing rules and filters that have been established to allow the system to process source data and determine if the data should be passed through in unprocessed form, or used to trigger a particular type of processing.

Although shown as separate from the processor-based device 104 in FIG. 2, the elements 120 and 122 may in fact be incorporated into the device 104, e.g., as particular portions of the memory 112. The manner in which the processor-based device 104 interacts with the filter/rules database 120 and the event log 122 is described in conjunction with FIGS. 3 and 4 below.

The adaptive engine 116 as shown in FIGS. 1 and 2 may represent one or more software programs stored in the memory 112 and executed by the processor 110. Alternatively, the adaptive engine 116 may be implemented in firmware, e.g., as an "evolvable" circuit on an embedded FPGA that is designed to determine and distinguish user preferences.

The adaptive engine 116 may include statistical correlation models of user behavior, case-based reasoning, artificial neural networks or other similar learning mechanisms. In the illustrative embodiment, the adaptive engine 116 comprises a semi-automated event chain query resolution process, i.e., an interactive process, which guides the system 100 in determining appropriate information presentation and resolving conflicts with previously-established rules. The adaptive engine 116 in this embodiment includes capabilities for event chain adaptation and rule chain trigger event resolution.

The event chain adaptation capability of the adaptive engine 116 may operate as follows. After determining that a particular event chain has terminated, e.g., by methods such as time outs, autocorrelation of event logs, or user directive, an event chain query resolution process examines each event in an event log and determines if the pending event should be part of a triggering chain. This can be done by simply querying the user with each pending event entry.

After the pertinent events have been identified, the user may be asked to identify the causal events and the reactive events, and order the two sets of events in either a strict sequence, general order, or assert that the sequence is irrelevant. The user may also be presented with a list of system states that the user is able to generalize or restrict, as being relevant to the event chain being considered, such as time of day, day of week, etc. In this way, a case-based knowledge base can be developed which reflects user preferences. The corresponding rules are stored in the filter/rules database 120 for future use in detecting particular events, e.g., trigger and filter events.

The rule chain trigger event resolution as implemented in adaptive engine 116 may involve the following. Conflicts can arise when a rule is entered into the database or when a trigger event chain is overridden by the user. An example of the latter is a situation in which the user allows a telephone answering machine to take a message under the same conditions for which the user previously answered the telephone. When these types of conflicts are detected, the user may be queried to determine what state information available to the system can be specified to delineate the two event chains, resulting in a specialization of the rules. Other resolution methods can also be used. For example, an old rule may be replaced with a new rule in cases in which the two rules are determined to be the same or sufficiently similar.

Detection of rules which are similar when entering rules into the filter/rule database may result in further querying of the user to determine if the two rules are in fact different or if they can be generalized into a single rule. This query process can identify the state differences for the user and allow the user to remove them as preconditions or combine them. An example of such a case is when similar events lead to the same actions but occur at two different times of the day. These same processes could be executed without the immediate interaction of the user using similarity-based reasoning or explanation-based learning but might be more error prone and therefore more frustrating to the user. These and other strategies could be selected based on marketing or testing decisions.

Figure 3:
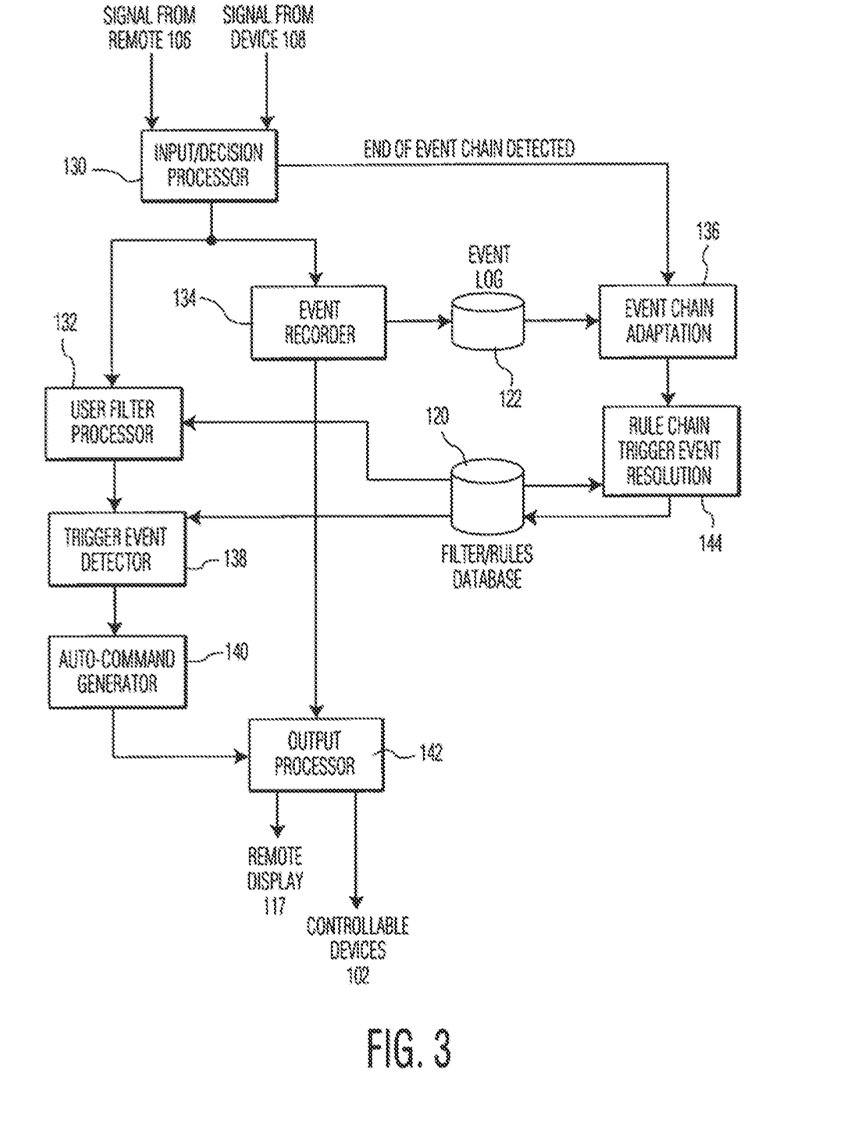
FIG. 3 is a data flow diagram showing the operation of the FIG. 1 system in an illustrative embodiment of the invention.

FIG. 3 is a data flow diagram showing the operation of the FIG. 1 system in an illustrative embodiment of the invention. The data flow shown in this example is implemented in the processor-based device 104 and utilizes the filter/rules database 120 and event log 122 of FIG. 2. Incoming control data 118 from the remote control device 106 and set of communications and data devices 108 are applied to an input/decision processor 130.

The signal from the remote control device 106 may be, e.g., a data transmission intended to control another device and being passed through the system 100 for event log processing. The signal from device(s) 108 may be, e.g., any signal from a device which acts as an information source with respect to the system 100. Such signals may be in the form of, e.g., unprocessed digital or analog media content, processed digital or analog media content, control signals, etc. One or more of the device(s) 108 may also act as information sinks with respect to the system 100, in that they can receive data from the system in forms such as, e.g., raw media content input, unprocessed and from outside the system, system processed and refined data, control signals, etc.

The input/decision processor 130 determines, e.g., if the end of an event chain has occurred, if the input data is the type that should be recorded in an event recorder 134 and/or if it should be processed in some way. Event chains may be terminated in any number of ways. For example, event chain termination may be based on user-directed input or a designated amount of time has elapsed between events.

The input/decision processor 130 drives a user filter processor 132, the above-noted event recorder 134, and an event chain adaptation element 136. The user filter processor 132 and trigger event detector 138 operate in accordance with information from the filter/rules database 120. The user filter processor determines if there is a user-specified request in the filter/rules database 120 which matches an event indicated by a given input signal. The event recorder 134 records, e.g., system events such as command and/or control signals and corresponding detectable system state information. The event chain adaptation element 136 determines, in a manner possibly aided by the user, which events contribute to an event chain that should trigger some action again in the future without having to be directed by the user.

The output of the user filter processor 132 may be applied to a trigger event detector 138, which generates an input to an auto-command generator 140 or the user filter processor may simply pass on the input. The output of the auto-command generator 140 is applied as an input to an output processor 142. The trigger event detector 138 determines if an incoming signal satisfies the conditions of any rule in the filter/rules database 120 such that generated actions should be taken, e.g., all conditions have been satisfied such that some stream of control signals should be generated that will mute the volume and activate a video hard disk or other recording device to record the current program. The auto-command generator 140 generates necessary control data 119, e.g., control commands or other signals, for controllable devices 102 based on the detection of a trigger event. The output processor 142 conditions data for output to the remote control device 106 or to one or more of the controllable devices 102.

The event recorder 134 processes event-related input received from the input/decision processor 130. The event recorder 134 records event information in the event log 122, and delivers appropriate output signals to the output processor 142. The contents of the event log 122 are used by the event chain adaptation element 136. The results of an event chain adaptation process are applied to a rule chain trigger event resolution element 144, which utilizes and updates information from the filter/rules database 120. The rule chain trigger event resolution element 144 resolves similar or conflicting rules in filter/rules database 120 such that specialized rules can be differentiated from general rules, and conflicting rules, if any, can be eliminated or differentiated from each other using additional system state information.

Figure 4:
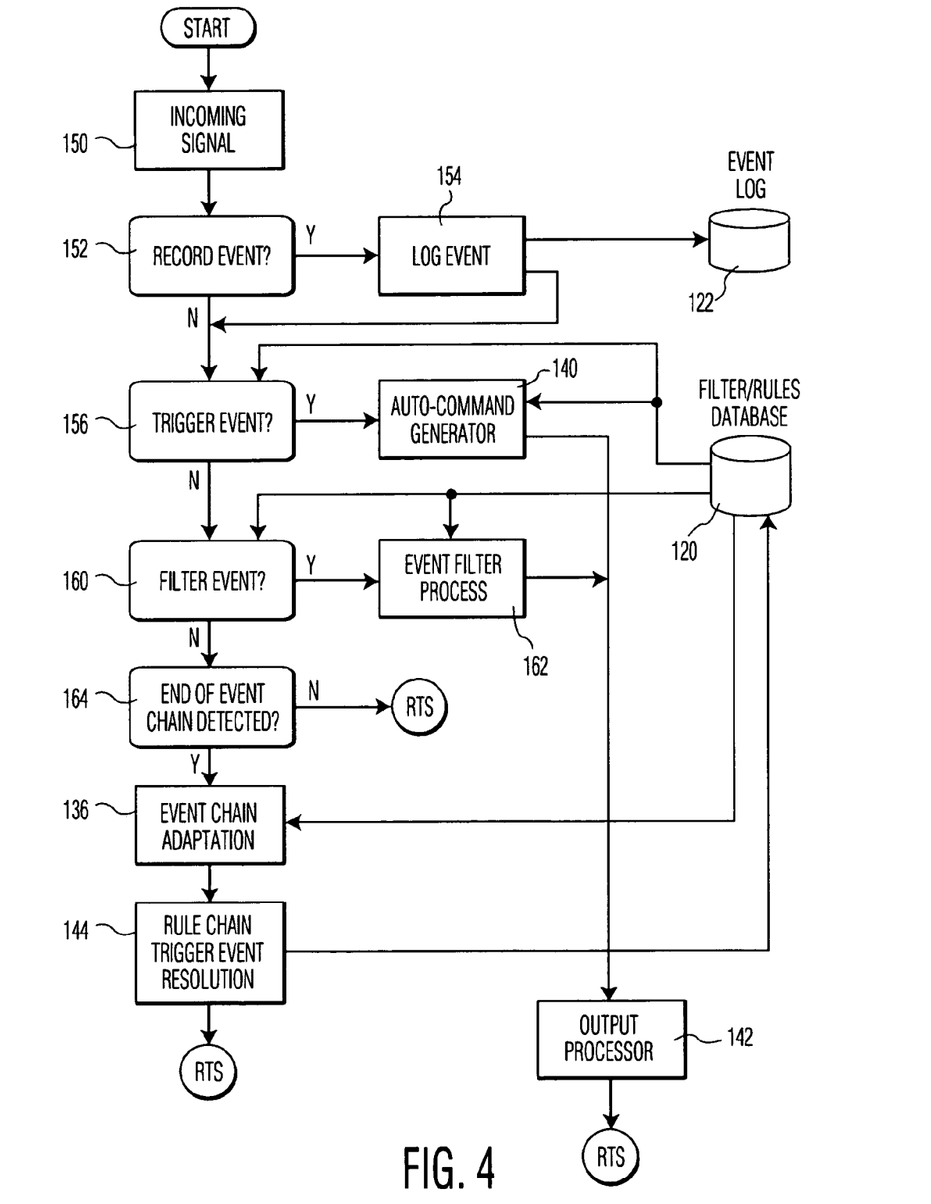
FIG. 4 is a process flow diagram corresponding to the data flow diagram of FIG. 3.

FIG. 4 is a flow diagram illustrating the operations of the processing elements of the FIG. 3 data flow diagram. At step 150, an incoming signal arrives in the input/decision processor 130 from either the remote control device 106 or one of the devices in the set of devices 108. Step 152 logs the incoming signal and associated information if appropriate, i.e., if the incoming signal corresponds to a record event. A record event is an event that leads to the recording of system-detectable state information, and is typically signaled by a system state change. If the incoming signal corresponds to a record event, the event is logged in step 154 by storing a suitable representation thereof in the event log 122.

An example of a record event is a signal received from a telephone indicating that an incoming call has been detected and the caller ID information for the calling party is (xxx) xxx-xxxx, which is the telephone number of Mrs. Jones (i.e., the user's mother). This information is recorded in the event log 122 for later processing along with other detectable system state information. System state information in this example may include, e.g., that a pay-per-view (PPV) movie is being viewed on the television 102, a VCR or other recording device is not on, audio is being transmitted via the stereo at a volume of 30 dB, and the date and time. This system state information is useful for rule formation in the filter/rules database 120 in case that the same event may subsequently correspond to a trigger event.

The FIG. 4 process then continues with step 156, which utilizes the filter/rules database 120 to determine if the incoming signal corresponds to a trigger event. A trigger event is an event which, when combined with all other system state information, satisfies the conditions of a rule in the filter/rules database 120, causing an action to be taken by the system automatically, or leading to the system suggesting an action to the user based on a confidence factor or user directive. If the incoming signal corresponds to a trigger event, the auto-command generator 140 uses the filter/rules database 120 to determine the appropriate command stream which is generated and dispatched via the output processor 142.

An example of a trigger event may be the detection of an incoming telephone call. The corresponding telephone number from caller ID information is checked in the filter/rule database 120 and determined to be a family member (e.g., the user's mother). This event triggers the display of a picture of the user's mother, e.g., on the remote control display 117, to let the user know who is calling. Other state information available in the system is checked against the filter/rules database 120, e.g., state information indicating that the stereo is currently on, a television show is being watched, etc. These conditions match rules that trigger command/control signals to be sent, e.g., to mute the stereo, to suspend display of the picture on the television, to activate a video hard disk to record the program, and to begin displaying a video conference connection so that the user can have a video conference with the caller.

Referring again to FIG. 4, if step 156 determines that the incoming signal does not correspond to a trigger event, the process continues to step 160, which determines if the incoming signal corresponds to a filter event. A filter event is one where the user has requested particular data which can be filtered from some incoming data stream. In this case, the user may not want to see the data stream all of the time or may not want to see all of the data (e.g., the weather, the stock market) but only when some new information or information of a particular type arrives (i.e., show me only these stocks or only show me when these stocks go above or below some threshold).

A filter event may trigger other events but does not necessarily generate command/control signals to other devices, thus distinguishing it from a trigger event. If the incoming signal does correspond to a filter event, an event filter process 162 utilizes information in the filter/rules database 120 to apply appropriate filtering to the incoming information, and if necessary generates an appropriate output to be transmitted by the output processor 142.

An example of a filter event may be the receipt of data from a web site, such as the above-noted pointcast web site, indicating, e.g., that the weather forecast for a particular area of interest, such as the Colorado mountains, is for two feet of snow this weekend. Since the user has set this as a filter criterion, residing in the filter/rules database 120, an alarm and/or icon is displayed or otherwise presented to the user via the remote control device 106, TV or other output device. The event filter process 162 generates the information needed to direct the presentation of the alarm and/or icon to the user via the remote control device 106, TV or other output device and forwards this information to the output processor 142.

If step 160 of FIG. 4 determines that the input signal does not correspond to a filter event, step 164 determines if the end of an event chain has been detected. If the end of an event chain has been detected, the event chain adaptation element 136 utilizes information in the filter/rules database 120 to begin event chain adaptation. The rule chain trigger resolution element 144 then makes the appropriate adjustment(s) to the filter/rules database 120 based on the adaptation performed in element 136. If step 164 determines that an end of event chain has not been detected, the process returns to start (RTS) as shown. The process also returns to start after the operations of the rule chain trigger event resolution element 144, and after generation of an appropriate output by the output processor 142.

The processing elements shown in the FIG. 3 data flow diagram, i.e., the input/decision processor 130, the user filter processor 132, the event recorder 134, the event chain adaptation element 136, the trigger event detector 138, the auto-command generator 140, the output processor 142 and the rule chain trigger event resolution element 144 may each be implemented in whole or in part as one or more software programs stored in memory 112 and executed by the processor 110 in the processor-based device 104.

As previously noted, the processor-based device 104 may be implemented in whole or in part using various types of known elements, such as FPGAs or other programmable devices, and could be incorporated in whole or in part into the remote control device 106, a television, a computer, a set-top box or other system device.

It should also be noted that the processor-based device 104 need not be co-located with the devices 102, 106, and 108, but may be connected to the system via, e.g., an Internet connection, a telephone connection, or other suitable connection allowing it to physically reside elsewhere. In addition, communications to the remote control device 106 or controllable devices 102 may be issued indirectly through a computer, infrared (IR) interface, or other appropriate networked device.

The above-described embodiments of the invention are intended to be illustrative only. For example, the invention can be used to implement the presentation of many other types of information in conjunction with learned user preferences, in a wide variety of different arrangements and configurations, in any desired type of video processing system or device, and in many applications other than those described herein. These and numerous other embodiments within the scope of the following claims will be apparent to those skilled in the art.

What is claimed is:

1. An apparatus for use in controlling the presentation of information to a user of a system, the apparatus comprising:
    a processor-based device operative to automatically determine at least one preference of the user with regard to one or more system actions based on (i) previous user actions in an event chain of context-sensitive user behavior that takes place within the system and (ii) corresponding system-detectable state information in the event chain of context-sensitive user behavior that takes place within the system, and to initiate subsequent execution of at least a subset of the system actions based on the determined preference,
    wherein the one or more system actions comprises presentation to the user via a remote control device of alarms and icons representing a particular type of information available from a particular information source that intelligently and adaptively reflect the previous user actions in the event chain of context-sensitive user behavior within the system, and
    further wherein the processor-based device performs: (I) detecting via an adaptive engine when (i) an event chain of context-sensitive user behavior in connection with a current system action conflicts with (ii) another event chain of context-sensitive user behavior in connection with a previous system action, and to query the user upon such detection to determine what additional system-detectable state information available to the system can be specified to delineate the two conflicting event chains from one another, resulting in specialized rules in connection with rule chain trigger event resolution of conflicts that arise in response to (a) a rule being entered into a filter/rules database of the system and (b) a trigger event chain being overridden by the user via context-sensitive user behavior within the system and (II) resolving, via a rule chain trigger event resolution element of the adaptive engine, (a) similar or conflicting rules in the filter/rules database such that the specialized rules that delineate two conflicting event chains from one another, are differentiated from general rules, and (b) conflicting rules, if any, are differentiated from each other using the determined additional system-detectable state information;
    wherein a particular set of one or more system actions are repeated under the control of the processor-based device when a corresponding set of one or more conditions are met.

2. The apparatus of claim 1 wherein the preference of the user is verified by the user prior to directing the presentation of information to the user.

3. The apparatus of claim 1 wherein at least a subset of the user actions are at least temporarily stored in at least one other system device and subsequently communicated from the other system device to the processor-based device over a transmission medium.

4. The apparatus of claim 3 wherein the other system device comprises a remote control device.

5. The apparatus of claim 1 wherein the repetition of the one or more system actions is implemented automatically without further input from the user.

6. The apparatus of claim 1 wherein the repetition of the one or more system actions is implemented semi-automatically upon receipt of an appropriate input from the user.

7. The apparatus of claim 1 wherein the repetition of the one or more system actions is implemented in a user-initiated manner in which execution of each of at least a subset of the set of actions occurs only upon receipt of an appropriate input from a user.

8. The apparatus of claim 1 wherein the information source comprises at least one of a network connection, a telephone connection, and a computer connection.

9. The apparatus of claim 1 wherein the information source comprises an information source associated with at least one of a security system, a satellite system, a terrestrial broadcast system, a cable system, and an information storage system.

10. The apparatus of claim 1 wherein the particular information comprises a designated event.

11. The apparatus of claim 10 wherein the processor-based device determines if the event comprises at least one of a record event, a trigger event, and a filter event each having particular system state information associated therewith.

12. The apparatus of claim 1 wherein the information presented to the user comprises an alarm signal associated with a particular event specified by the user.

13. The apparatus of claim 1 wherein the information presented to the user comprises a visible icon.

14. The apparatus of claim 1 wherein the information presented to the user comprises audio information.

15. The apparatus of claim 1 wherein the information presented to the user comprises speech information.

16. The apparatus of claim 1 wherein the information presented to the user comprises tactile information.

17. The apparatus of claim 1 wherein the processor-based device is further operative to automatically provide control of at least one additional device based at least in part on the determined preference.

18. The apparatus of claim 1 wherein at least one of the user actions comprises data converted from a recognition system.

19. The apparatus of claim 1 wherein at least a portion of the system state information comprises data converted from a recognition system.

20. A method for use in controlling the presentation of information to a user of a system, the method comprising the steps of:
    automatically determining, by a processor-based device, at least one preference of the user with regard to one or more system actions based on (i) previous user actions in an event chain of context-sensitive user behavior that takes place within the system and (ii) corresponding system-detectable state information in the event chain of context-sensitive user behavior that takes place within the system; and
    initiating subsequent execution of at least a subset of the system actions based on the determined preference,
        wherein the step of initiating subsequent execution of at least a subset of the system actions comprises presenting to the user, via a remote control device, alarms and icons representing a particular type of information available from a particular information source that intelligently and adaptively reflect the previous user actions in the event chain of context-sensitive user behavior within the system, and further comprising the step of detecting via an adaptive engine when (i) an event chain of context-sensitive user behavior in connection with a current system action conflicts with (ii) another event chain of context sensitive user behavior in connection with a previous system action, and querying the user upon such detection to determine what additional system-detectable state information available to the system can be specified to delineate the two conflicting event chains from one another, resulting in specialized rules in connection with rule chain trigger event resolution of conflicts that arise in response to (a) a rule being entered into a filter/rules database of the system and (b) a trigger event chain being overridden by the user via context-sensitive user-behavior within the system, and resolving (a) similar or conflicting rules in the filter/rules database such that the specialized rules, that delineate two conflicting event chains from one another, are differentiated from general rules, and (b) conflicting rules, if any, are differentiated from each other using the determined additional system-detectable state information;

wherein a particular set of one or more system actions are repeated under the control of the processor-based device when a corresponding set of one or more conditions are met.

21. An article of manufacture comprising a non-transitory machine-readable storage medium containing one or more software programs for use in controlling presentation of information to a user of a system, wherein the programs when executed implement the steps of:

automatically determining, by a processor-based device, at least one preference of the user with regard to one or more system actions based on (i) previous user actions in an event chain of context-sensitive user behavior that takes place within the system and (ii) corresponding system-detectable state information in the event chain of context-sensitive user behavior that takes place within the system;

detecting via an adaptive engine when (i) an event chain of context-sensitive user behavior in connection with a current system action conflicts with (ii) another event chain of context-sensitive user behavior in connection with a previous system action;

querying the user upon a detection of conflict in said detecting step to determine what additional system-detectable state information available to the system can be specified to delineate the two conflicting event chains from one another, resulting in specialized rules in connection with rule chain trigger event resolution of conflicts that arise in response to (a) a rule being entered into a filter/rules database of the system and (b) a trigger event chain being overridden by the user via context-sensitive user behavior within the system;

resolving (a) similar or conflicting rules in the filter/rules database such that the specialized rules, that delineate two conflicting event chains from one another, are differentiated from general rules, and (b) conflicting rules, if any, are differentiated from each other using the determined additional system-detectable state information; and initiating subsequent execution of at least a subset of the system actions based on the determined preference, wherein the step of initiating subsequent execution of at least a subset of the system actions comprises presenting to the user, via a remote control device, alarms and icons representing a particular type of information available from a particular information source that intelligently and adaptively reflect the previous user actions in the event chain of context-sensitive user behavior within the system;

wherein a particular set of one or more system actions are repeated under the control of the processor-based device when a corresponding set of one or more conditions are met.

* * * * *